United States Patent
Liang et al.

(10) Patent No.: US 9,145,133 B2
(45) Date of Patent: Sep. 29, 2015

(54) METHOD AND SYSTEM FOR SELECTING AN ENGINE OPERATING POINT FOR A HYBRID VEHICLE

(71) Applicant: Ford Global Technologies, LLC, Dearborn, MI (US)

(72) Inventors: Wei Liang, Farmington Hills, MI (US); Mark Steven Yamazaki, Canton, MI (US); Xiaoyong Wang, Novi, MI (US); Rajit Johri, Ann Arbor, MI (US); Ryan Abraham McGee, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 173 days.

(21) Appl. No.: 14/075,356

(22) Filed: Nov. 8, 2013

(65) Prior Publication Data
US 2015/0134160 A1    May 14, 2015

(51) Int. Cl.
*B60W 20/00* (2006.01)
*B60W 10/06* (2006.01)
*B60W 10/08* (2006.01)

(52) U.S. Cl.
CPC ............ *B60W 20/108* (2013.01); *B60W 10/06* (2013.01); *B60W 10/08* (2013.01); *Y10S 903/93* (2013.01)

(58) Field of Classification Search
USPC ......................................................... 701/22
See application file for complete search history.

(56) References Cited

U.S. PATENT DOCUMENTS

| | | | | |
|---|---|---|---|---|
| 1,958,427 A | * | 5/1934 | Hainsworth | 74/336.5 |
| 2,599,525 A | * | 6/1952 | Randol | 477/81 |
| 2,976,743 A | * | 3/1961 | Gordon et al. | 477/111 |
| 5,847,470 A | * | 12/1998 | Mitchell | 290/45 |
| 8,103,397 B2 | | 1/2012 | Liang et al. | |
| 8,112,207 B2 | | 2/2012 | Heap et al. | |
| 8,219,303 B2 | | 7/2012 | Schwenke et al. | |
| 8,608,617 B2 | * | 12/2013 | Stervik | 477/32 |
| 2001/0016536 A1 | * | 8/2001 | Minowa et al. | 477/5 |
| 2008/0041653 A1 | * | 2/2008 | Rogg | 180/338 |
| 2008/0300761 A1 | * | 12/2008 | Matsubara et al. | 701/61 |
| 2009/0023547 A1 | * | 1/2009 | Matsubara et al. | 477/3 |
| 2009/0062063 A1 | * | 3/2009 | Yamanaka et al. | 477/5 |
| 2010/0114442 A1 | * | 5/2010 | Kadota | 701/68 |
| 2012/0083173 A1 | | 4/2012 | McMillan | |
| 2012/0101671 A1 | * | 4/2012 | Caouette | 701/21 |
| 2012/0142490 A1 | * | 6/2012 | Yun | 477/5 |
| 2012/0165148 A1 | * | 6/2012 | Boskovitch et al. | 475/5 |
| 2012/0215390 A1 | * | 8/2012 | Wang | 701/22 |
| 2012/0226406 A1 | * | 9/2012 | Kaita et al. | 701/22 |

* cited by examiner

*Primary Examiner* — Shelley Chen
(74) *Attorney, Agent, or Firm* — David B. Kelley; Brooks Kushman P.C.

(57) ABSTRACT

A vehicle includes a powertrain having an engine and an electric machine (M/G) connected by an upstream clutch, and a gearbox connected to the M/G by a torque converter. A controller is configured to, in response to a Park or Neutral gear selection and an electrical power request from the M/G, operate the engine at an engine speed and an engine torque based on the request and M/G speed and torque for improved powertrain efficiency. A method is provided for controlling a vehicle. In response to a Park or Neutral gear selection and an electrical power request from the M/G, the engine is operated at an engine speed and an engine torque based on the request and M/G speed and torque for improved powertrain efficiency.

17 Claims, 4 Drawing Sheets

METHOD AND SYSTEM FOR SELECTING AN ENGINE OPERATING POINT FOR A HYBRID VEHICLE

TECHNICAL FIELD

Various embodiments relate to selecting an engine operating point in a hybrid vehicle.

BACKGROUND

Hybrid electric vehicles (HEV's) utilize a combination of an internal combustion engine with an electric machine to provide the power and torque needed to propel the vehicle. This arrangement provides improved fuel economy over a vehicle that has only an internal combustion engine. Because there are multiple power sources, the vehicle or powertrain efficiency may be increased based controlling the operation of the engine and the electric machine.

SUMMARY

According to an embodiment, a method for controlling a vehicle having an engine selectively coupled to an electric machine by an upstream clutch with the electric machine selectively coupled to a step ratio transmission gearbox by a downstream clutch is provided. In response to a park or neutral gear selection in the gearbox and a request for an electrical power from the electric machine acting as a generator, the engine is operated at an engine speed and an engine torque determined from a solution for an optimized powertrain efficiency that satisfies the request for electrical power from the electric machine and maximizes a combined efficiency of the engine and the electric machine.

According to another embodiment, a vehicle is provided with a powertrain having an engine and an electric machine (M/G) connected by an upstream clutch, and a gearbox connected to the M/G by a torque converter. A controller is configured to, in response to a Park or Neutral gear selection and an electrical power request from the M/G, operate the engine at an engine speed and an engine torque based on the request and M/G speed and torque for improved powertrain efficiency.

According to yet another embodiment, a method is provided for controlling a vehicle having an engine selectively coupled to an electric machine (M/G) by an upstream clutch with the M/G selectively coupled to a step ratio transmission gearbox by a torque converter. In response to a Park or Neutral gear selection and an electrical power request from the M/G, the engine is operated at an engine speed and an engine torque based on the request and M/G speed and torque for improved powertrain efficiency.

Various embodiments of the present disclosure have associated, non-limiting advantages. For example, a method is provided for use with a hybrid vehicle having a transmission with a Park and/or Neutral gear to provide an engine speed and torque command based on a power output required from the electric machine acting as a generator that provides for an increased powertrain efficiency. The engine and the electric machine together form the prime movers of the powertrain. A torque converter may also be included in the powertrain. The method may operate the engine and powertrain with a reduced or minimum fuel consumption for a given generator output power requirement. The method calculates an engine speed and torque, or equivalently the a electric machine speed and torque, as a desired or optimal operating point of the system. The losses in the powertrain, including engine, generator and accessory losses, are minimized by the method for the given power generation output. The effect of altitude may be included in the method to provide for a high powertrain efficiency. Noise, vibration, and harshness factors may also be included in the method to provide an optimized powertrain efficiency in Park or Neutral while meeting user expectations for vehicle noise and operation.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Figure 1:
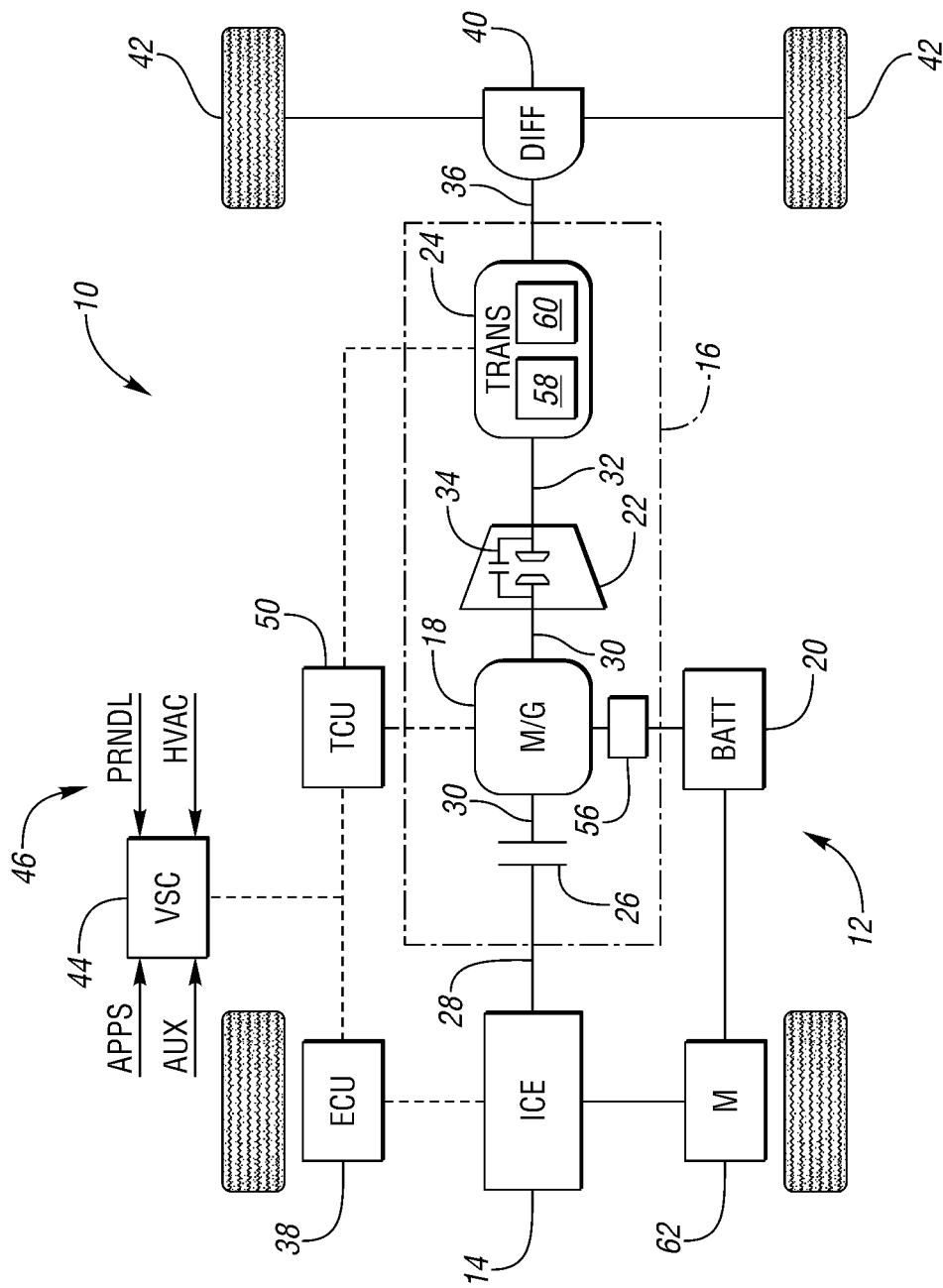
FIG. 1 is a schematic of a hybrid vehicle according to an embodiment.

FIG. 1 illustrates a schematic diagram of a hybrid vehicle (HEV) 10 according to an embodiment. FIG. 1 illustrates representative relationships among the components. Physical placement and orientation of the components within the vehicle may vary. The vehicle 10 includes a powertrain 12. The powertrain 12 includes an engine 14 that drives a transmission 16, which may be referred to as a modular hybrid transmission (MHT). In the embodiment illustrated, the various powertrain 12 components of the vehicle 10 are positioned sequentially in series with one another. As will be described in further detail below, the vehicle 10 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the vehicle 10. The engine 14 generally represents a prime mover that may include an internal combustion engine such as a gasoline, diesel, or natural gas powered engine, or a fuel cell. The engine 14 generates an engine torque and corresponding engine power that is supplied to the M/G 18 when a disconnect clutch 26 or upstream clutch between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18. The power electronics 56 may include a motor controller in communication with a control system 46.

In some embodiments, the vehicle 10 also includes a starter motor 62 operatively connected to the engine 14, for example, through a belt or gear drive. The starter motor 62 may be used to provide torque to start the engine 14 without the addition of torque from the M/G 18, such as for a cold start or some high speed starting events. The starter motor 62 may be a low voltage motor and have an associated low voltage battery connected to the traction battery 20 using a DC-DC converter.

When the disconnect clutch 26 is at least partially engaged, torque flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transfers torque using its fluid coupling, and torque multiplication may occur depending on the amount of slip between the impeller and turbine sides. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22. The bypass or lock-up clutch for the torque converter may be selectively engaged to create a mechanical connection between the impeller side and the turbine side for direct torque transfer. The bypass clutch 34 may be slipped and/or opened to control the amount of torque transferred through the torque converter from the M/G 18 to the transmission 24.

The torque converter bypass clutch 34 may be operated as a launch clutch to provide smooth vehicle launch. Alternatively, or in combination, a launch clutch or downstream clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch. The torque converter 22 with the launch clutch 34 may be collectively known as a downstream torque transfer device.

Although the operation of the clutches 26, 34 described uses the term "pressure", thereby implying a hydraulic clutch, other types of devices, such as electromechanical clutches or torque converters where appropriate may also be used. In the case of hydraulic clutches, the pressure on the clutch plates is related to torque capacity. In the same way, the forces acting on the plates in a non-hydraulic clutch are also related to torque capacity. Therefore, for consistency in nomenclature, unless otherwise specifically defined, the operation of the clutches 26, 34 described herein are in terms of "pressure", though it is understood that it also includes situations where a non-hydraulic force is applied to the clutch plates in a non-hydraulic clutch.

When one of the clutches 26, 34 is locked or engaged, the rotational speeds of the driveline components on either side of the clutch are equal. Slip is the speed difference from one side of a clutch to the other, such that when one of the clutches is slipping, one side has a different speed than the other side. For example, if the crankshaft 28 rotational speed is at 1500 rpm and the disconnect clutch 26 is slipping 100 rpm, the M/G shaft 30 side of the disconnect clutch 26 is at 1400 rpm. The clutch may be locked by increasing the pressure to the clutch until there is no slip in the clutch and may include increasing the pressure to a maximum design pressure. Engaging the clutch may refer to controlling and/or locking the clutch.

All of the input torque to the transmission gearbox 24 flows through the torque converter 22. The gearbox 24 may include gear sets (not shown) that are selectively placed in different gear ratios by selective engagement of friction elements such as clutches and brakes to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a transmission control unit (TCU) 50. The gearbox 24 then provides powertrain output torque to output shaft 36.

The transmission 24 may be an automatic, step ratio transmission gearbox and connected to the drive wheels 42 in a conventional manner, and may include a differential 40. The vehicle 10 is also provided with a pair of non-driven wheels, however, in alternative embodiments, a transfer case and a second differential can be utilized in order to positively drive all of the vehicle wheels. The automatic, step ratio transmission 24 has a gear box to provide various gearing ratios for the vehicle 10. The transmission 24 gearbox may include clutches and planetary gearsets, or other arrangements of clutches and gear trains as are known in the art. The transmission 24 may be an automatic six speed transmission, or other speed automatic transmission as is known in the art. The transmission 24 may also be another step-ratio transmission as is known in the art.

The transmission 24 is controlled using the TCU 50, or the like, to operate on a shift schedule, such as a production shift schedule, that connects and disconnects elements, such as shifting clutches within the gear box to control the ratio between the transmission output and transmission input. The transmission 24 is illustrated as having a park mechanism 58 and at least one shifting clutch 60. The use and control of the park mechanism 58 and the shifting clutch 60 in an automatic transmission is known in the art. When the park mechanism is engaged, the transmission 24 is in Park. When the park mechanism 58 and shift clutch 60 are disengaged, the transmission 24 is in Neutral. Park or Neutral may be selected using a gear selection via the PRNDL input. When the transmission 24 is in Park or Neutral, torque flow through the transmission 24 is interrupted such that any torque at the input to the transmission 24 is not transmitted to the output of the transmission 24 and to the wheels. The TCU 50 may also act to control the M/G 18, and the clutches 26, 34.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. For example, an AMT may be used in applications with higher torque requirements.

The M/G 18 is in communication with a battery 20. The battery 20 may be a high voltage battery. The M/G 18 may be configured to charge the battery 20 in a regeneration mode, for example when vehicle power output exceeds driver demand, through regenerative braking, or the like. The M/G 18 may also be placed in a generator configuration with negative torque output to moderate the amount of engine 14 torque provided to the driveline 16 or to control the speed at the input side of the transmission 24. When the M/G 18 output speed is decreased, an associated negative M/G 18 torque output provides battery 20 charge. In one example the battery 20 is configured to connect to an external electric grid, such as for a plug-in electric hybrid vehicle (PHEV) with the capability to recharge the battery from an electric power grid, which supplies energy to an electrical outlet at a charging station. A low voltage battery (not shown) may also be present to provide power to the starter motor or other vehicle components, or low voltage power may be provided through a DC to DC converter.

An engine control unit (ECU) 38 is configured to control the operation of the engine 14. A vehicle system controller (VSC) 44 transfers data between the TCU 50 and ECU 38 and is also in communication with various vehicle sensors. The control system 46 for the vehicle 10 may include any number of controllers, and may be integrated into a single controller, or have various modules. Some or all of the controllers may be connected by a controller area network (CAN) or other system. The control system 46 may be configured to control operation of the various components of the transmission 24, the motor generator assembly 18, and the engine 14 under any of a number of different conditions, including in a way that provides a consistent quality upshift.

The VSC 44 determines when and how much torque and power each primary mover needs to provide in order to meet the driver's torque demand, vehicle power demand, and to achieve the operating points (torque and speed) of the engine 14 and M/G 18. The VSC 44 may interpret a total vehicle torque which includes any positive or negative engine 14 or M/G 18 torque as well as road load torque. The VSC 44 may also interpret a total vehicle power which includes any positive or negative engine 14 or M/G 18 power as well as auxiliary power demands.

The control system 46 controls various actuators in response to signals from various sensors to control functions such as starting/stopping engine 14, operating M/G 18 to provide wheel torque or charge battery 20, selecting or scheduling transmission shifts, etc. Control system 46 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, control system 46 may communicate signals to and/or from engine 14, disconnect clutch 26, M/G 18, launch clutch 34, transmission gearbox 24, and power electronics controller 56. Although not explicitly illustrated, those of ordinary skill in the art will recognize various functions or components that may be controlled by control system 46 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence percent, intake air flow (MAF), transmission gear, ratio, or mode, transmission oil temperature (TOT), transmission turbine speed (TS), torque converter bypass clutch 34 status (TCC), deceleration or shift mode (MDE), for example.

Under normal powertrain conditions (no subsystems/components faulted), the VSC 44 interprets the driver's demands, and then determines the wheel torque command based on the driver demand and powertrain limits. An accelerator pedal is used by the driver of the vehicle to provide a demanded torque, power, or drive command to propel the vehicle. The VSC 44 receives signals from an accelerator pedal position sensor (APPS) and a brake pedal to determine vehicle acceleration or deceleration demands.

To drive the vehicle using the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy to power electronics 56 that may include an inverter, for example. The power electronics 56 convert DC voltage from the battery 20 into AC voltage to be used by the M/G 18. The power electronics 56 convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

The M/G 18 and the battery 20 have an electrical limit that provides a maximum positive and negative torque or power available electrically. The electrical limit may be based on a number of factors, including, but not limited to, M/G temperature, state of charge of the battery, battery temperature, maximum electric machine torque and speed, and the like. The electrical limit may vary as the vehicle operating conditions change, and may be determined by the control system 46. The control system 46 may monitor the battery temperature, voltage, current, state of charge (SOC) and determine the maximum allowable discharge power limit and the maximum allowable charge power limit at that time.

The TCU 50 and VSC 44 cooperate to provide control of the gear ratio of the transmission 24 and shifting. The VSC 44 may receive a PRNDL command from a user input, such as a gear shift lever. When the user requests park (P), the VSC 44 and TCU 50 cooperate to engage the park mechanism 58 in the transmission 24. When the user requests neutral (N), the VSC 44 and the TCU 50 cooperate to disengage the park mechanism 58 and/or the shifting clutch 60.

The torque converter allows the engine/machine speed different from the transmission input speed. When the vehicle is stopped, the transmission input speed is zero. The engine and the motor may be stopped to eliminate idling losses. The engine and/or the electric machine may also be operated to charge the battery 20 or to supply energy to vehicle systems and accessories. Vehicle systems and accessories include the heating, ventilation, and air conditioning (HVAC) system, an accessory connected to vehicle and drawing power from the electrical system (AUX) such as a power tool, a mobile device, etc., preparation for a cold start, emissions systems control, and other commands or flag set or received by the control system 46 that cause an engine pull up when the vehicle is stationary or in Park or Neutral. In one embodiment, the vehicle 10 has an electrical connector such as an alternating current connector, where the user may connect a standard 110 or 220 Volt alternating current device, such as a power tool or extension cord for use when the vehicle is stationary, mobile device or battery charger, etc. The engine and the electric machine is decoupled from the vehicle speed when the vehicle is in Park or Neutral (P/N) gear. The TCU 50 may place the vehicle in a park neutral gear when the vehicle is stationary. Since the vehicle 10 is a series hybrid with a continuously variable engine speed and torque, the efficiency of the powertrain when the vehicle speed is zero may need to be increased or optimized.

For a conventional vehicle with only an engine, the engine is controlled in an idling mode when the transmission is in Park or Neutral that maintains operation of the engine at the minimum loss (or highest available efficiency) with a low engine load. The engine idle speed control for the conventional vehicle may be set such that it is not affected or disturbed by accessory loads.

For other hybrid vehicle architectures, such as a powersplit hybrid vehicle, the vehicle may not have a traditional gearbox that allows for the vehicle to be placed in neutral gear. For example, in U.S. Pat. No. 8,103,397 issued on Jan. 24, 2012, and hereby incorporated by reference herein, the vehicle has an engine and two electric machines connected by a planetary gearset. In order for the vehicle to be placed in Neutral, the engine, generator, and electric machine torque and speed must all be controlled to compensate for one another through the planetary gearset to provide a passive neutral gear, and the power output and speed of the engine may be limited or controlled based on the constraints caused by the planetary gearset.

The vehicle 10 has a conventional gearbox 24 which allows for much larger power generation and engine power output in a P or N gear, which in turn allows for battery charging or for other power utilization purposes, such as meeting auxiliary vehicle loads or power demands. Controlling the engine speed and torque output and providing a method for increasing overall powertrain efficiency therefore differs from solutions provided by the prior art. A method is provided that determines an operating point of the engine and the electric machine to increase or maximize powertrain efficiency.

Figure 2:
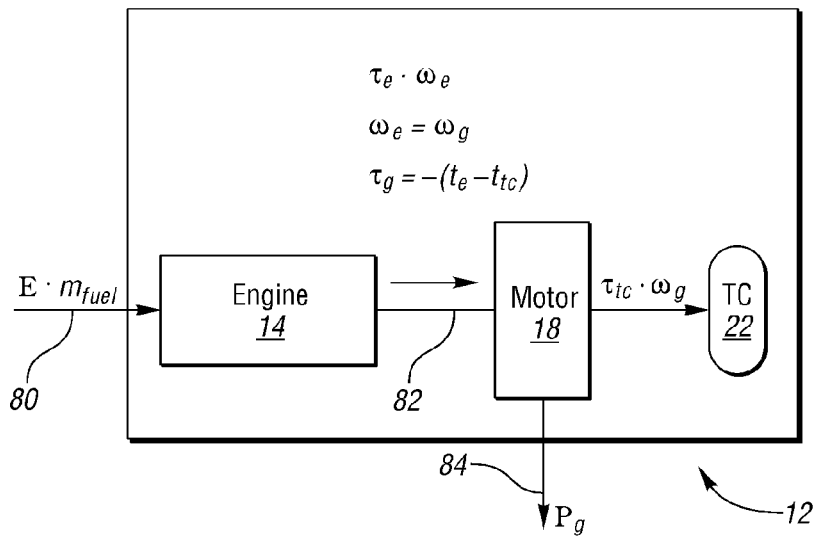
FIG. 2 is a block diagram for the vehicle of FIG. 1 illustrating power flow paths in the vehicle.

FIG. 2 illustrates a diagram showing power flow paths for the vehicle 10 when the vehicle is in Park or Neutral. The VSC 44 determines that engine 14 operation is needed to meet vehicle power demands. The control system 46 engages and locks the upstream clutch 26. Vehicle power demands include using the electric machine 18 as a generator to charge the battery 20, for example, when the state of charge of the battery is below a threshold value. Vehicle power demands also include demands by other vehicle systems or components such as the HVAC system. For example, the engine 14 may be required to operate in order to provide heat to a vehicle cabin. Alternatively, the engine 14 may be required in order to operate the air conditioning in the HVAC system to cool the passenger cabin. Vehicle power demands also include auxiliary loads such as a user connecting a device to vehicle that requires electrical power from the vehicle to operate.

With the disconnect clutch locked, the torque relationship at the impeller or input shaft to the torque converter 22 is $$\tau_{imp} = \tau_e + \tau_g$$

where $\tau_e$ is the torque output of the engine 14 and $\tau_g$ is the torque output of the electric machine 18. The torque output of the electric machine 18, $\tau_g$, is positive if the machine is operated as a motor. The torque output of the electric machine 18, $\tau_g$, is negative if the machine is operated as a generator to charge or provide power to the battery 20.

With regard to FIG. 2 with the transmission 24 in a Park or Neutral gear and the upstream clutch 26 locked, the engine 14 may be operated to provide an output torque while the electric machine 18 is operated as a generator to provide electric power to either charge the battery or supply the power for other vehicle or auxiliary demands. The mass flow rate of fuel that flows into the engine is $\dot{m}_f$ (kilograms per second). At 80, $E \cdot \dot{m}_f$ kJ/s (or kW) of power goes into the engine 14, where E is the heat value of the fuel. The engine 14 mechanical power output at 82 before the engine inertia is considered is $P_e = \tau_e \cdot \omega_e$, where $P_e$ is the power output of the engine in kW and $\omega_e$ is the rotational speed of the output shaft of the engine (*radians* per second).

A portion of the engine 14 power may be used to overcome any losses in the torque converter 22. Another portion of the engine power drives the electric machine 18 acting as a generator to generate electrical power for the battery 20. The generator operates at the same speed as the engine as the upstream clutch 26 is locked such that $\omega_e = \omega_g$ and the electric machine torque is negative because it is operating as a generator. The mechanical power of the electric machine 18 is $\tau_g \omega_g$.

The electric machine 18 output power at 84 takes the form:

$$P_g = \tau_g \omega_g - P_{eloss}(\tau_g, \omega_g)$$

where $P_g$ is the generator output power at 84, and $P_{eloss}(\tau_g, \omega_g)$ are the losses by the generator and is a function of electric machine speed and torque.

The engine and electric machine may be operated in many ways to results in the same electric power output, $P_g$. As power is equal to torque times speed, a high speed and low torque engine output may produce the same power as a low speed and high torque engine output, thereby resulting in a series of solutions for the same power output. Some combinations may be more efficient than others, with the efficiency of the engine and the efficiency of the electric machine contributing to an overall system efficiency. The overall system efficiency, $\eta_{pwr}$, may be defined as:

$$\eta_{pwr} = \frac{P_g}{E \cdot m_{fuel}}$$

The control system 46 determines a powertrain operating point for the engine and electric machine such that the efficiency, $\eta_{pwr}$, is maximized for a given power output $P_g$. The control system 46 determines an engine and electric machine speed for the optimum powertrain operating point as:

$$\omega_e^* = \underset{\omega_e}{\mathrm{argmax}}(\eta_{pwr})$$

$$= \underset{\omega_e}{\mathrm{argmax}}\left(\frac{\tau_g \omega_g - P_{eloss}(\tau_g, \omega_g)}{\frac{\tau_e \omega_e}{\eta_e(\tau_e, \omega_e)}}\right)$$

where the equation constraints are $\omega_e = \omega_g$, $P_g = \tau_g \omega_g - P_{eloss}(\tau_g, \omega_g)$ and $$\eta_e(\tau_e, \omega_e) = \frac{\tau_e \omega_e}{E \cdot m_{fuel}}.$$

The function argmax provides an argument that results in the maximum powertrain efficiency. $P_{eloss}$ is the loss map of the electric machine and represents the efficiency of the machine at different speed and torque point. The efficiency of the engine, $\eta_e(\tau_e, \omega_e)$, is an engine efficiency map for various engine speeds and torques. Candidates, or the search space, of the equation for $\omega_e^*$ are pairs of $(\omega_e, \tau_e)$. The pair must satisfy the equation: $P_g = \tau_g \omega_g - P_{eloss}(\tau_g, \omega_g)$. The equation for $\omega_e^*$ results in the maximum engine and electric machine efficiency such that a combined loss of these two actuators is at a minimum value. The engine and the electric machine may not be operating at their most efficient points, however, the combination has the maximum powertrain efficiency for the constraints that are set. An optimal engine torque, $\tau_e^*$, is derived from the results of the equation for $\omega_e^*$, and is not an independent variable.

The power output of the engine takes the form:

$$P_e = P_g + P_{eloss}(\tau_g, \omega_g) + P_{tc}(\omega_g)$$

where $P_{tc}$ is the torque converter contribution to power loss. The torque converter power loss may be calculated for a given impeller speed based on the torque converter characteristics. If the bypass clutch 34 is locked, the torque converter power loss may be zero.

To obtain a result for equation for $\omega_e^*$, various optimization methods or techniques may be used. For example, a direct searching method may used as the base algorithm. In other examples, simplex or gradient based search methods may also be used to find a solution.

For given $P_g$, the optimization method first defines a vector of generator speed $\{\omega_{g1}, \omega_{g2}, \ldots, \omega_{gn}\}$ that lies within the allowed speed range for the powertrain as the search space. Then for each generator speed, the generator torque may be iteratively determined using the equation, $P_g = \tau_g \omega_g - P_{eloss}(\tau_g, \omega_g)$. This results in a torque vector of $\{\tau_{g1}, \tau_{g2}, \ldots, \tau_{gn}\}$. The engine torque may then be calculated using equation, $\tau_{imp} = \tau_e + \tau_g$. Note that the impeller torque, $\tau_{imp}$, in the equation represents the torque converter loss as the transmission is in park or neutral. The torque converter loss may be determined using the torque converter characteristics for given speed and slips. The engine speed and the torque converter impeller speed are the same as the electric machine speed.

The fuel usage vector $\{m_{fuel1}, m_{fuel2}, \ldots, m_{fueln}\}$ is then determined based on $$\frac{\tau_e \omega_e}{\eta_e(\tau_e, \omega_e)}$$

and then the minimum fuel usage is determined from the fuel usage vector. The corresponding engine speed, $\omega_e^*$, and torque, $\tau_e^*$, are the solution of optimization of the fuel usage vector.

The searching method described above provides the resolution of the obtained $\omega_e^*$ and does not use complex searching techniques. Of course, other optimization methods may also be used to determine the solution for the engine speed, $\omega_e^*$, and torque, $\tau_e^*$.

The searching method described herein, or other searching methods may be conducted offline to determine a map of optimal engine operating points at different output power levels. An example of this map is illustrated in FIG. 3.

Figure 3:
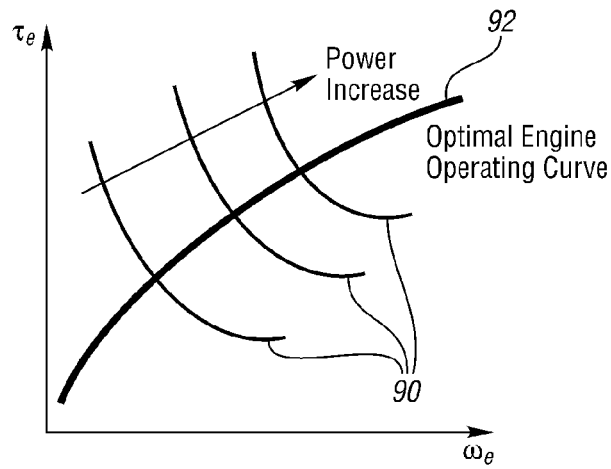
FIG. 3 is a chart illustrating various engine operating points.

FIG. 3 plots the engine torque, $\tau_e$, versus the engine speed, $\omega_e$. A series of curves 90 are illustrated that each represent a constant electric power output, $P_g$, from the electric machine. Line 92 represents an optimal engine operating curve and is based on the solution from the above searching algorithm for engine speed, $\omega_e^*$, and torque, $\tau_e^*$.

Figure 4:
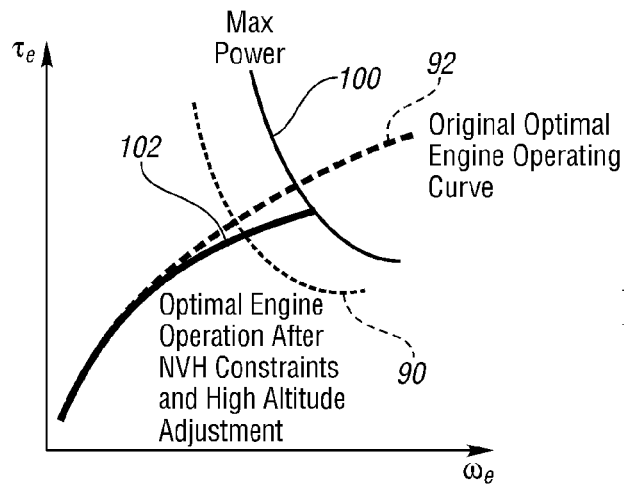
FIG. 4 is another chart illustrating various engine operating points.

FIG. 4 plots an adjusted engine torque, $\tau_e$, versus the engine speed, $\omega_e$ for use in controlling the engine 14 and the electric machine 18 of the vehicle 10. Noise and vibration (NVH) while the vehicle 10 is in Park or Neutral are considered and the operating engine speed and torque ($\omega_e^*,\tau_e^*$) may need to be adjusted based on NVH requirements. For example, higher engine speed and higher engine torque may generally result in a higher NVH impact on the user. The optimum engine speed and torque may be constrained or limited by the NVH requirements for engine speed and torque output in Park or Neutral. For example, the noise and vibration requirements may result in upper and lower thresholds for engine speed and engine torque that act as boundaries for the solution or band the curve. For example, a maximum engine speed may be specified as a threshold for providing a maximum acceptable powertrain noise level. The maximum engine torque at any engine speed may also be limited to prevent vibration above a threshold value in the vehicle cabin.

The operating engine speed and torque ($\omega_e^*,\tau_e^*$) may also need to be adjusted based on the vehicle being at a high altitude as the engine maximum torque output is reduced due to the altitude effect. This may affect the operating engine speed and torque ($\omega_e^*,\tau_e^*$) when the optimized engine torque is close to the maximum engine torque. The altitude may provide an upper threshold value or an upper boundary or band for engine torque, and the optimum powertrain operating point may need to be lowered based on this threshold value.

A final optimum result after any NVH constraints and altitude adjustment is illustrated in FIG. 4. Curve 90 is represents a constant electrical power output, $P_g$. Line 92 represents the optimal engine operating curve before adjustments and is based on the solution from the above searching algorithm for engine speed, $\omega_e^*$, and torque, $\tau_e^*$. Line 100 represents an upper threshold value based on NVH levels and/or altitude. Curve 102 illustrates the resulting adjusted operating engine speed and torque ($\omega_e^*,\tau_e^*$) curve that includes the adjustments due to NVH and/or altitude thresholds.

Figure 5:
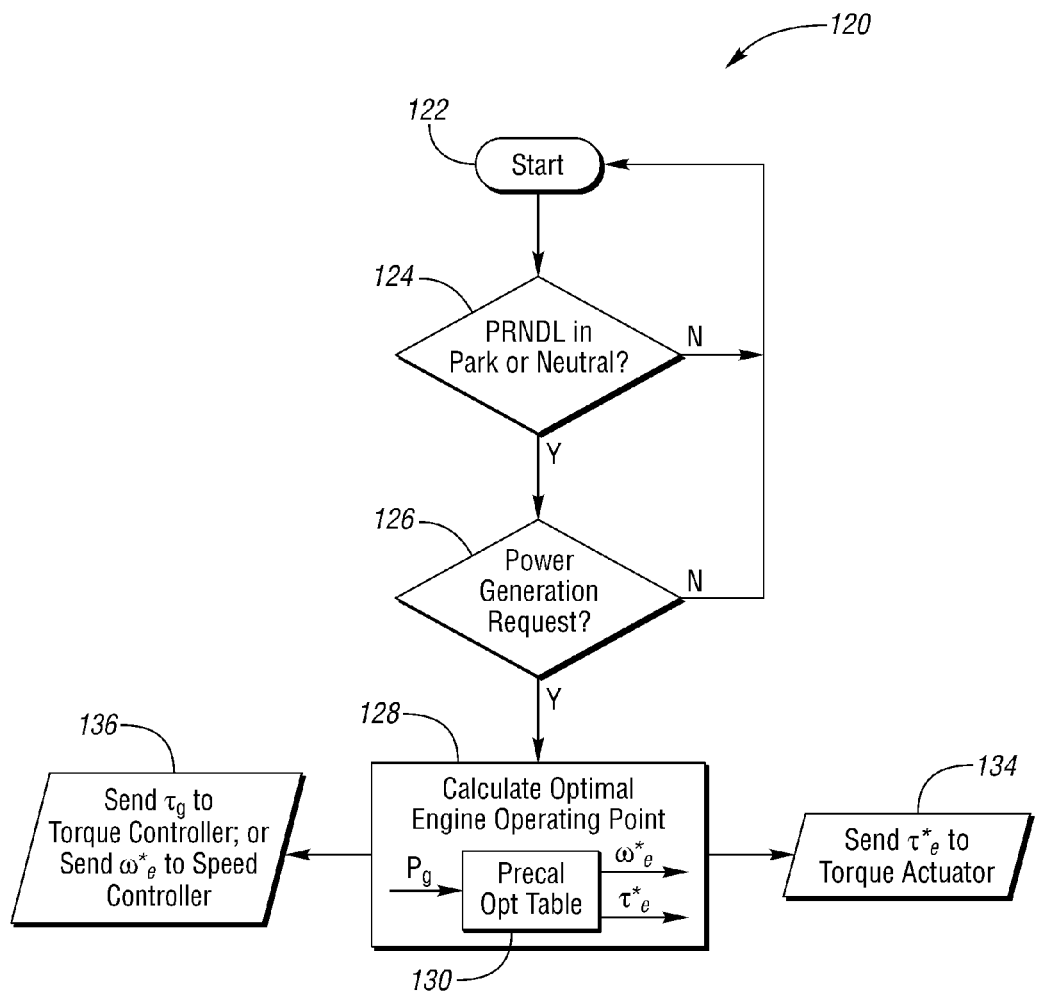
FIG. 5 is a flow chart illustrating a method of controlling a hybrid vehicle according to an embodiment.

FIG. 5 illustrates a method 120 of controlling the vehicle 10 according to an embodiment. Various steps in the flow chart may be rearranged or omitted, and other steps may be added within the spirit and scope of the disclosure. The method 120 may also be applied to other hybrid vehicle architectures as are known in the art with similar constraints on the engine, electric machine, and other vehicle components. The method 120 provides for a determination of an operating speed and torque for the engine to provide for an optimized or maximized powertrain efficiency when the vehicle is in Park or Neutral and the electric machine is operating as a generator.

At least a portion of the method 120 may be conducted offline to pre-calculate a calibration table including ($\omega_e^*,\tau_e^*$) pairs for given power output. Alternatively, the method 120 may be undertaken during vehicle operation by the control system 46.

The control system 46 uses method 120 and begins at block 122. The control system 46 then proceeds to block 124 and determines if the transmission 24 is in Park or Neutral. If the vehicle is in Park or Neutral, the control system 46 proceeds to block 126 and determines if a power generation request has been received. For a power generation request, the electric machine 28 is commanded to operate as a generator to meet vehicle power demands that exceed the existing capability or state of the battery. A power generation request may be made to charge the battery 20 or to supply energy to vehicle systems and accessories.

If a power generation request has been made at 126, the control system 46 then confirms that the upstream clutch 26 is engaged and locked, and commands it to a locked state if the clutch 26 is slipping or open. The method 120 then proceeds to block 128 and determines the engine operating point using a calibration table 130 or by conducting the calculations described previously. The control system 46 uses the requested electric machine output power to the battery, $P_g$, and the various constraints and losses in the system to calculate a ($\omega_e^*,\tau_e^*$) value that maximizes powertrain efficiency while remaining within limits set for vehicle operation, i.e. NVH, altitude, etc.

After the ($\omega_e^*,\tau_e^*$) value has been determined, the control system 46 sends out commands to control the operation of the powertrain of the vehicle. The control system 46 commands the engine 14 to output the determined torque value, $\tau_e^*$, at 134. The control system 46 commands the electric machine 18 to operate as a generator to provide a negative torque output, or power to the battery at 136. The control system 46 commands the electric machine 18 to output a generator torque, $\tau_g$, based on the requested electric machine output power to the battery, $P_g$, the engine output torque, $\tau_e^*$, and any losses in the vehicle. For example, the control system 46 may calculate the desired generator torque, $\tau_g$, using the equation: $\tau_g = -(\tau_e^* - \tau_{tc,loss})$ or based on the equation: $P_g = \tau_g \omega_g - P_{eloss}(\tau_g, \omega_g)$. Alternatively, instead of directly controlling the electric machine torque at 136, the control system might employ a speed controller for the electric machine. The speed controller takes the optimal target speed $\omega_e^*$ as the reference and produces the torque command to the electric machine so the target speed can be tracked. Ideally the torque command should be equal or close to the desired generator torque $\tau_g$ as determined earlier. Using the speed controller, the system operation may be more robust. Note that the engine speed and the electric machine speed are equal to one another due to the locked upstream clutch 26.

Figure 6:
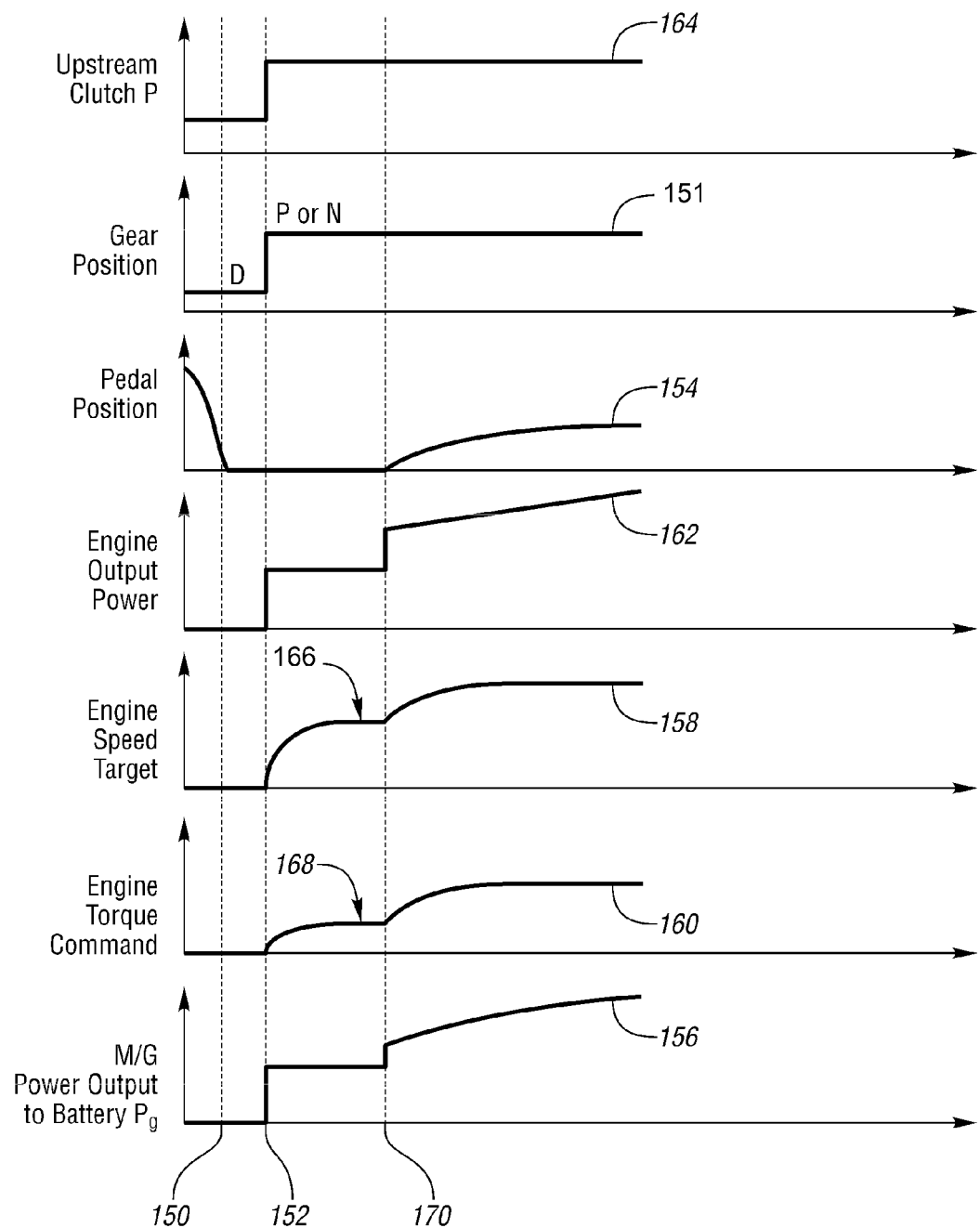
FIG. 6 is a timing chart for the hybrid vehicle illustrating an example of an implementation of the method of FIG. 5.

FIG. 6 illustrates an example of a timing chart or a signal diagram for the implementation of method 120 in vehicle 10. Before time 150, the vehicle is operating in Drive, as shown by line 151. The APPS signal is shown by line 154, and is decreasing until the user has completely tipped out, or released the pedal. In another embodiment, line 154 may also encompass additional vehicle power demands, such as HVAC, battery SOC requirements, auxiliary power requirements, and the like. The electric machine is operating as a motor to meet the APPS signal before time 150, as the engine power output is shown as zero.

After time 150, the vehicle may be stationary or coasting, and there is no demand for power from the electric machine or engine. At time 152, the vehicle is commanded and placed in Park or Neutral gear as shown by line 151. A vehicle power demand is present, such as HVAC operating, a battery SOC below a threshold value, an accessory power load, or the like, that causes a power demand from the electric machine operating as a generator at line 156. The control system 46 determines a ($\omega_e^*, \tau_e^*$)$_1$ value for a desired engine operating point to maximize powertrain efficiency. Engine speed is shown by line 158. Engine torque is shown by line 160.

The control system 46 commands the engine to operate, or pulls up the engine, beginning at time 152 as shown by the engine output power 162. The control system 46 commands the upstream clutch 26 to a locked position, as shown by the increase in commanded hydraulic pressure to the clutch in line 164. After the engine is pulled up it reaches the $(\omega_e^*, \tau_e^*)_1$ value, shown by arrows 166, 168.

At time 170, an additional power demand on the vehicle begins, as shown by the APPS signal 154. The additional power demand may be from a tip in at the APPS, from the user adding an additional auxiliary power connection or commanding the HVAC to operate, or the like. This increases the power demand from the generator in line 156. In order to meet the increasing power demand from the generator 156, the engine power output also increases, as shown by line 162.

The control system 46 determines a new $(\omega_e^*, \tau_e^*)_2$ value for a desired engine operating point to maximize powertrain efficiency for the changing power demand from the generator 156. After the engine is commanded to the $(\omega_e^*, \tau_e^*)_2$ value.

As the power output from the generator 156 changes, the requested engine power 162 also changes. The control system 46 may calculate a series of $(\omega_e^*, \tau_e^*)$ target values for transient engine power outputs as well as for target steady state engine power outputs. By controlling the engine to a $(\omega_e^*, \tau_e^*)$ value, the overall powertrain efficiency of the vehicle may be increased while any NVH, altitude, or other constraints are met when the vehicle is in Park or Neutral.

According to one example, it may be determined that the control system 46 is using method 120. The vehicle is placed into a Park or Neutral gear and the accelerator pedal input is gradually increased and decreased by varying the pedal position. The engine speed and torque output is monitored as the pedal position changes. If the engine speed and torque correspond to what a calibration table, such as table 130, would provide as values for $(\omega_e^*, \tau_e^*)$, then it is likely that the control system 46 is implementing method 120.

Various embodiments of the present disclosure have associated, non-limiting advantages. For example, a method is provided for use with a hybrid vehicle having a transmission with a Park and/or Neutral gear to provide an engine speed and torque command based on a power output required from the electric machine acting as a generator that provides for an increased powertrain efficiency. The engine and the electric machine together form the prime movers of the powertrain. A torque converter may also be included in the powertrain. The method may operate the engine and powertrain with a reduced or minimum fuel consumption for a given generator output power requirement. The method calculates an engine speed and torque, or equivalently the a electric machine speed and torque, as a desired or optimal operating point of the system. The losses in the powertrain, including engine, generator and accessory losses, are minimized by the method for the given power generation output. The effect of altitude may be included in the method to provide for a high powertrain efficiency. Noise, vibration, and harshness factors may also be included in the method to provide an optimized powertrain efficiency in Park or Neutral while meeting user expectations for vehicle noise and operation.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a powertrain having an engine and an electric machine (M/G) connected by an upstream clutch;
a gearbox connected to the M/G by a torque converter; and
a controller configured to, in response to a Park or Neutral gear selection and an electrical power request from the M/G, operate the engine at an engine speed and an engine torque based on the request and M/G speed and torque for improved powertrain efficiency.

2. The vehicle of claim 1 wherein the controller is further configured to, in response to a Park or Neutral gear selection and an electrical power request from the M/G, operate the M/G as a generator.

3. The vehicle of claim 2 wherein the controller is further configured to, in response to a Park or Neutral gear selection and an electrical power request from the M/G, operate the M/G at a torque output generally equal to torque losses in the torque converter minus the engine torque.

4. The vehicle of claim 1 wherein the controller is further configured to, in response to a Park or Neutral gear selection and an electrical power request from the M/G, lock the upstream clutch.

5. The vehicle of claim 4 wherein the controller is further configured to, in response to a Park or Neutral gear selection and an electrical power request from the M/G, operate the M/G at the engine speed.

6. The vehicle of claim 1 wherein the powertrain efficiency comprises an efficiency of the engine, an efficiency of the M/G, and an efficiency of the torque converter.

7. The vehicle of claim 1 wherein the gearbox comprises a park mechanism, and
wherein the controller is further configured to receive a signal indicative of the park mechanism being engaged to determine the gear selection.

8. The vehicle of claim 1 wherein the gearbox comprises a shifting clutch, and
wherein the controller is further configured to receive a signal indicative of the shifting clutch being disengaged to determine the gear selection.

9. The vehicle of claim 1 wherein the gearbox is an automatic, step ratio transmission gearbox.

10. A method for controlling a vehicle having an engine selectively coupled to an electric machine (M/G) by an upstream clutch with the M/G selectively coupled to a step ratio gearbox by a torque converter, comprising, in response to a Park or Neutral gear selection and an electrical power request from the M/G, operating the engine at an engine speed and engine torque based on the request and M/G speed and torque for improved powertrain efficiency.

11. The method of claim 10 further comprising, in response to a Park or Neutral gear selection and an electrical power request from the M/G, operating the M/G as a generator at a torque output generally equal to torque losses in the torque converter minus the engine torque.

12. The method of claim 10 further comprising, in response to a Park or Neutral gear selection and an electrical power request from the M/G, engaging the upstream clutch such that the M/G operates at the engine speed.

13. The method of claim 10 wherein the engine speed and engine torque are selected as a ($\omega_e^*, \tau_e^*$) target value based on a solution for an optimized powertrain efficiency that satisfies the request for electrical power from the M/G and incorporates an efficiency of the engine, an efficiency of the M/G, and an efficiency of the torque converter.

14. The method of claim 13 wherein the solution for an optimized powertrain efficiency is limited by a threshold value for engine torque and a threshold value for engine speed to reduce noise and vibration from the engine.

15. The method of claim 13 wherein the solution for an optimized powertrain efficiency is limited by a threshold value for engine torque when the vehicle is above an altitude.

16. The method of claim 10 further comprising receiving a signal indicative of a parking mechanism being engaged to determine the gear selection.

17. The method of claim 10 further comprising receiving a signal indicative of a shifting clutch being disengaged to determine the gear selection.

* * * * *